United States Patent [19]

Browne

[11] 4,045,624
[45] Aug. 30, 1977

[54] CONTINUOUS MONITORING IN CARRIER TELEPHONE SYSTEMS

[75] Inventor: Sidney Browne, Falls Church, Va.

[73] Assignee: Carrier Telephone Corporation of America, Inc., Falls Church, Va.

[21] Appl. No.: 672,934

[22] Filed: Apr. 2, 1976

[51] Int. Cl.² .............................................. H04B 3/46
[52] U.S. Cl. ......................... 179/175.3 R; 179/2.5 R
[58] Field of Search ................... 179/175.3 R, 15 FD, 179/15 BF, 2.5 R

[56] References Cited

U.S. PATENT DOCUMENTS

| 2,572,030 | 10/1951 | Jacobsen et al. | 179/15 BF |
| 2,601,425 | 6/1952 | Bartelink | 179/15 FD |
| 3,806,655 | 4/1974 | Hekimian et al. | 179/2.5 R |
| 3,840,706 | 10/1974 | Krasin et al. | 179/2.5 R |

Primary Examiner—Douglas W. Olms
Attorney, Agent, or Firm—Rose & Edell

[57] ABSTRACT

A continuous monitoring arrangement for a carrier telephone system utilizes the subscriber carrier at a reduced level when the subscriber set is on-hook. Proper reception of the reduced carrier level at the central office circuit during on-hook condition verifies operability of the carrier frequency circuitry. In a preferred embodiment the central office carrier, which is always present, is modulated by a control tone in the audio range during on-hook conditions. The control tone is detected at the subscriber circuit and modulates the reduced level subscriber carrier whereby reception of the control tone back at the central office circuit verifies operability of all carrier and voice frequency circuits at both subscriber and central office locations.

9 Claims, 2 Drawing Figures

CONTINUOUS MONITORING IN CARRIER TELEPHONE SYSTEMS

BACKGROUND OF THE INVENTION

The present invention relates to apparatus and methods for continuously monitoring the operability of individual channels in a carrier telephone system.

Carrier telephone systems are characterized by the use of different carrier frequencies for each subscriber so that multiple subscribers can share a common transmission line between the subscriber stations and the central office. Such systems typically employ a central office terminal for each subscriber circuit. Information transmitted from each central office terminal to its associated subscriber circuit employs a unique carrier frequency; likewise, transmission from each subscriber circuit to its associated central office terminal utilizes another unique carrier frequency. Thus if twelve subscribers share a transmission line, there would be twelve unique central office carrier frequencies (for transmission to the subscribers) and twelve unique subscriber carrier frequencies (for transmission to the central offices).

The industry has long sought a continuous automatic monitoring arrangement for carrier systems whereby failure or inoperability of any subscriber channel would be automatically indicated. Numerous manually-initiated operability testing arrangements have been suggested, typified by that disclosed in U.S. Pat. No. 3,840,706 to Krasin et al. However, a continuous automatic approach, if feasible, would have the advantages of freeing personnel for other duties and eliminating the periods of unrecognized inoperability which may exist between manually-initiated tests. An automatic continuous monitoring approach also permits the telephone company to become aware of an inoperable channel before the subscriber, thereby permitting the channel to be repaired and put back in service without the subscriber ever knowing the channel was not operating.

The major problem in providing an automatic continuous monitoring system for carrier telephone systems derives from the subscriber on-hook condition. During off-hook condition the subscriber carrier is transmitted in most carrier systems, and this carrier can be monitored at the central office terminal. However, for on-hook conditions, the subscriber carrier is generally not transmitted. Transmission of test signals back to the central office is therefore not possible during on-hook conditions without considerable modifications to existing equipment. Such modification is both time consuming and expensive, particularly where the subscriber circuit must be extensively modified.

One approach to automtically continuously monitoring carrier system operation is suggested in U.S. Pat. No. 2,572,030 to Jacobsen et al. In that patent, the testing arrangement is limited to carrier systems of the suppressed carrier type (i.e. — where one or both sidebands but not the carrier is transmitted between the central office terminal and the subscriber circuit). The patent recognizes that there is always some carrier leakage in suppressed carrier systems and that this leaked carrier signal can be used to monitor channel operability. If the leaked carrier is not received, or is received at an abnormally low level, a failure indicator is actuated. The limitation of this approach to suppressed carrier systems makes it unavailable for most carrier telephone systems in operation today. Moreover, this approach only monitors carrier frequency circuits in the channel; it does not monitor the voice frequency circuits which, if inoperable, present just as much of a problem as the carrier frequency circuits.

It is therefore an object of the present invention to provide a method and apparatus for automatically and continuously monitoring the operability of a carrier telephone system.

It is another object of the present invention to provide a method and apparatus for automatically and continuously monitoring the operability of both carrier and voice frequency circuits in a carrier telephone system.

SUMMARY OF THE INVENTION

In accordance with the present invention, the subscriber carrier is intentionally transmitted at a significantly reduced level when the subscriber circuit is in the on-hook condition. Detection of this reduced carrier level at the central office terminal is an indication of operability of the carrier frequency circuits in the transmit portion of the subscriber circuit and the receive portions of the central office terminal. The central office carrier is normally maintained on during both off and on-hook conditions so that operability of the carrier circuitry for transmission in the opposite direction can likewise be monitored. All that need be added to the subscriber circuit for this technique is an attenuator and a gate to vary the transmitted subscriber carrier level from off-hook to on-hook conditions.

This technique is extended to monitor all voice circuits in the channel by simply modulating the always-present central office carrier with a control tone in the voice frequency band. The thusly modulated central office carrier is transmitted to the subscriber circuit where the control tone is demodulated, passed through the voice circuits, and, during on-hook conditions, feeds through the usual hybrid transformer to the transmit section. Upon passing through the voice circuits in the transmit section, the control modulates the low level subscriber carrier which is then transmitted back to the central office terminal. Detection of the low level subscriber carrier and control tone at the central office carrier is an indication of voice and carrier frequency circuit operability throughout the channel in the on-hook condition. Reception of the subscriber carrier at normal level during off-hook condition serves as an indication of operability of the carrier frequency circuits, it being assumed that inoperability of the voice circuits will be evident in the off-hook condition (i.e. — conversation mode).

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein.

DESCRIPTION OF PREFERRED EMBODIMENTS

Figure 1:
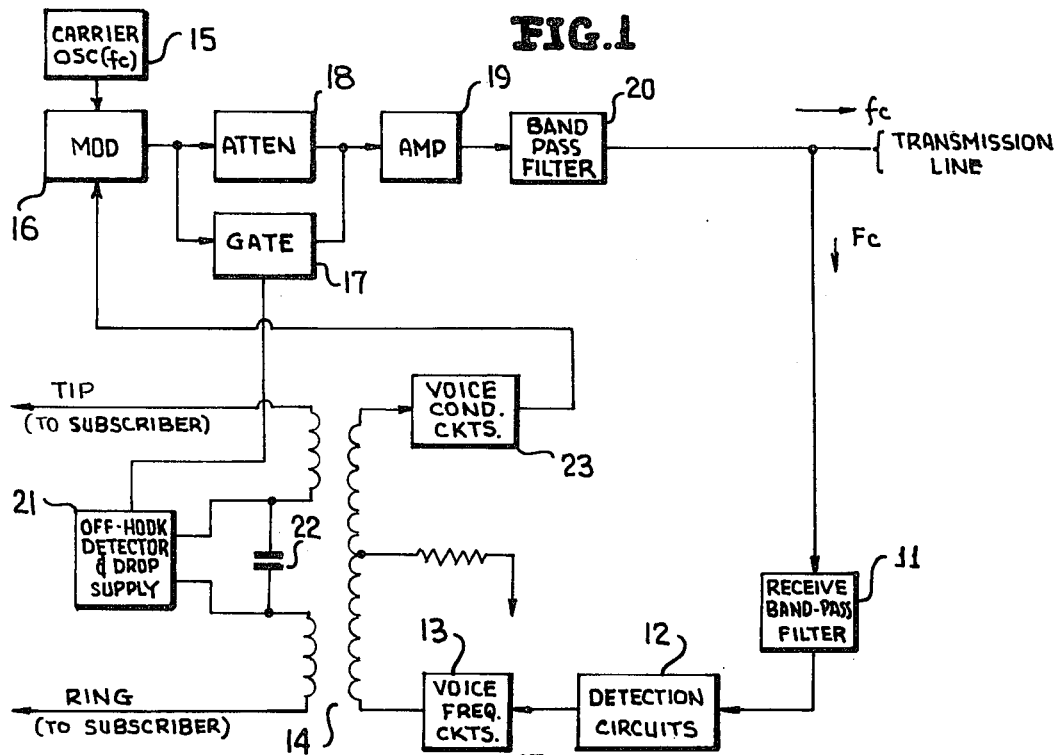
FIG. 1 is a block diagram of a subscriber circuit in a carrier telephone system, modified in accordance with a preferred embodiment of the present invention.

Referring specifically to FIG. 1 of the accompanying drawings, a carrier system subscriber circuit according to the present invention is illustrated in block diagrammatic form. Communication in the system is conducted over a common transmission line which, for example, may be a single pair of wires. Signals appearing on the shared transmission line are filtered by bandpass filter 11 so that only the sideband or sidebands of the central office carrier ($F_c$) are passed to detection circuits 12. The detection circuits convert the passed sideband(s) to the voice frequency band (nominally 300 to 3300 Hz). The voice signals are passed to the voice frequency circuits 13 where they are filtered and otherwise processed in a conventional manner before being applied to the subscriber's instrument via hybrid transformer 14. The receive portion of the subscriber circuit, as thus far described, is conventional and the circuits used therein are well known.

The transmit portion of the subscriber circuit includes an oscillator 15 or other source of subscriber carrier signal at frequency $f_c$. For example, in the system disclosed in my prior U.S. Pat. No. 3,804,988, oscillator 15 would be replaced by a frequency divider which divides the received central office carrier frequency $F_c$ down to the desired subscriber carrier frequency $f_c$. The subscriber carrier is modulated by subscriber audio or voice signals applied through hybrid transformer 14 and the usual voice conditioning circuits 23 to amplitude modulator 16. The thusly modulated carrier is alternatively passed through gate 17 or attenuator pad 18 which are connected in parallel. When the gate is actuated substantially all of the AM signal is passed through the gate which, in effect, shorts out the attenuator. When the gate is not actuated, the AM signal must pass through the attenuator 18 and experience a substantial reduction in level thereby. In either case, the AM signal is amplified by amplifier 19 and filtered by bandpass filter 20 before being applied to the common transmission line.

An off-hook detector 21 is connected in a conventional manner between to series-connected secondary coils of hybrid transformer 14. Also conventional is a capacitor 22 connected in parallel with detector 21 between the two secondary coils. Apart from its conventional operation in carrier telephone systems, detector 21 provides the gating signal for gate 17 so that the gate is actuated when the subscriber set is off-hook and unactuated when the subscriber set is on-hook. In this manner the subscriber circuit is able to transmit a normal level carrier signal (via gate 17) during the off-hook condition and an attenuated carrier signal (via attenuator 18) during the on-hook condition. This occurs by simply adding 17 and attenuator 18 to an otherwise conventional subscriber circuit.

Figure 2:
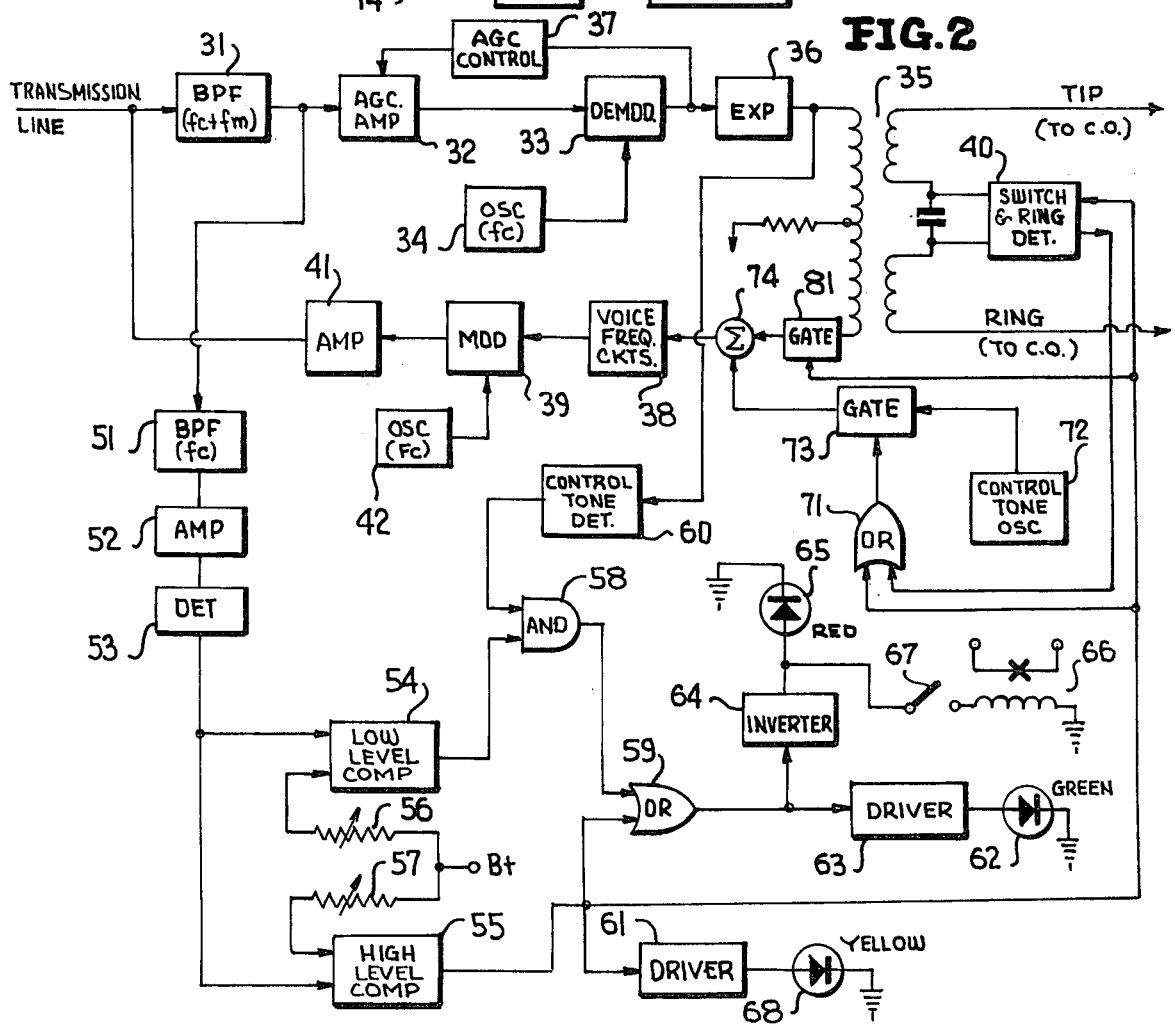
FIG. 2 is a block diagram of a central office terminal for use with the subscriber circuit of FIG. 1.

A central office terminal suitable for operation with the subscriber circuit of FIG. 1 is illustrated in FIG. 2. A bandpass filter 31 passes the desired sideband modulation and subscriber carrier $f_c$ received from the subscriber via the common transmission line and applies it to an automatic gain-controlled (AGC) amplifier 32. The amplified sideband is demodulated at demodulator 33 which also receives a signal at the subscriber carrier freqency ($f_c$) from a local oscillator 34. This oscillator, as is the case with oscillator 15 of FIG. 1, may be a frequency divider which divides the central office carrier $F_c$ (from oscillator 42) down to the subscriber frequency for demodulation purposes. The detected output signal from demodulator 33 is applied through an expander circuit 36 across hybrid transformer 35 which applies this voice signal to the main central office circuit for transmission to another subscriber. An AGC control circuit 37 senses the level of the detected signal provided by demodulator 33 and controls the gain of amplifier 32 accordingly. The receive portion of the central office terminal, as thus far described, is conventional.

The transmit portion of the central office terminal includes conventional voice frequency conditioning circuits 38 which condition audio or voice signals from hybrid transformer 35 and apply them to amplitude modulator 39. The voice signal modulates the central office carrier $F_c$ from oscillator 42 and the resulting modulated signal is passed through tuned amplifier 41 to the common transmission line for transmission to the subscriber circuit of FIG. 1. The transmit portion of the central office terminal, as thus far described, is conventional in carrier telephone systems.

The circuitry for automatically and continuously monitoring operation of the entire channel (i.e. — central office terminal and subscriber circuit) will now be described. The output signal from bandpass filter 31 is additionally applied to a narrow band filter 51 which passes only the received carrier $f_c$. This carrier is then amplified by amplifier 52 and converted by peak detector 53 to a DC level representative of the amplitude of received subscriber carrier $f_c$. The detected DC level is applied to each of low level comparator 54 and high level comparator 55. Low level comparator receives a DC low level reference signal via adjustable resistance 56 and provides an output signal whenever the detected carrier level from detector 53 exceeds the low reference level. High level comparator 55 receives a high level DC reference level via adjustable resistance 57 and provides an output signal whenever the detected carrier level from detector 53 exceeds the high reference level. Adjustable resistance 56 is adjusted at the time of installation in a manner to inhibit the output signal from comparator 54 when the received low level subscriber carrier on the on-hook mode is so low as to constitute malfunction. Likewise, adjustable resistance 57 is adjusted at the time of installation to inhibit the output carrier from comparator 55 when the received subscriber carrier in the off-hook mode is lower than required for proper system operation.

When the detected subscriber carrier level exceeds the low reference level, comparator 54 applies a logic 1 signal to a two-input AND gate 58. The other input signal to AND gate 58 comes from a control tone detector 60 which receives the output signal from expander 36 and provides an output signal if a tone of a particular frequency is detected. Such circuits are well known and may, for example, comprise a narrow band filter at the control tone frequency followed by a DC detector for providing a DC level corresponding to the amplitude of the detected tone. A threshold discrimination circuit may be used to prevent output signals from detector circuit 60 unless the detected control tone attains at least some minimally acceptable level.

The output signal from AND gate 58 is applied to two-input OR gate 59 along with the output signal from high level comparator 55. A logic 1 output signal from OR gate 59 is operative to energize a green light-emitting diode (LED) 62 via driver circuit 63. Driver 63 is a slow release amplifier which maintains a logic 1 output signal for approximately one second after the applied signal is removed. This serves to keep the green LED 62 on during normal switching conditions. A logic 0 signal from OR gate 59 is inverted by inverter 64 to actuate both a red LED 65 and an alarm relay 66 which energizes an audible alarm (not shown). A switch 67 is connected in series between inverter 64 and relay 66 to permit the operator to cut off the audible alarm.

The output signal from the high level comparator is also applied to the switch and ring detector circuit, to another two-input OR gate 71, and to a driver circuit 61 for yellow LED 68. Switch and ring detector 40 is a conventional circuit which, among other things, provides a pulsed output signal at approximately 20 to 30 Hz whenever a ring signal is to be applied to the subscriber set (i.e. — the subscriber is being called). This pulsed signal is applied to the second output of OR gate 71. A signal transmission gate 73 is controlled by OR gate 71. Specifically, gate 73 passes a voice frequency control tone from oscillator 72 to signal summer 74 whenever OR gate 71 provides a logic 0 output signal. A logic 1 from OR gate 71 turns gate 73 off and prevents the control tone from reaching the summer 74. The summer serves to add the signal from gate 73 to the voice signal applied to voice conditioning circuits 38 from hybrid transformer 35 so that the summed signal can be transmitted to the subscriber as modulation of the central office carrier.

In the preferred embodiment of this invention, the control tone is a 1400 Hz tone used for ringing purposes but could be any frequency in the voice channel passband deemed suitable for the purpose. The 1400 Hz tone may, for example, be pulsed on and off (at 16⅔ to 66⅔ Hz rate) when ringing of the subscriber is required. In the present system, as will be described, the 1400 Hz tone is inhibited during the off-hook condition and continuously on during the on-hook condition except during ringing when it is pulsed off and on at the 20 to 30 Hz rate by detector 40 and gates 71 and 73.

The operation of the monitoring circuitry in the subscriber off-hook (busy) mode will be described first. When the subscriber is off-hook, gate 17 (FIG. 1) is actuated to permit the modulated subscrier carrier to be transmitted at its normal level. Upon being received at the central office terminal, the subscriber carrier is separated from its sideband by filter 51, amplified and detected before being applied to both low and high level comparators 54 and 55. If the received carrier is above the reference level set by resistance 57, high level comparator 55 provides a logic 1 signal which: (1) inhibits the red or abnormal LED indicator 65 and the alarm relay 66; (2) energizes the normal or green LED 62; energizes the yellow off-hook and dial indication 68; (3) inhibits gate 73 (via OR gate 71) to prevent control tone from oscillator 72 from being summed with the voice signal; and (4) provides an indication of the off-hook condition to switch and ring detector 40. At this time the low level detector 54 also provides a logic 1 output signal since the reference level set by resistance 56 is considerably lower than that set by resistance 57 and therefore if the high level comparator is actuated the low level comparator must likewise be actuated. However, in the off-hook mode the signal from low level comparator 54 has no effect because AND gate 58 is inhibited by control tone detector 60. Specifically, since gate 73 is maintained off by the high level comparator, no control tone is transmitted to the subscriber and, therefore, the control tone cannot be returned to the central office for detection by detector 60.

If, still in the off-hook condition, the received carrier falls below the reference level set by resistance 57, the output signal from comparator 55 becomes logic 0. This causes the yellow off-hook LED 68 to de-energize immediately and the green normal LED 62 to de-energize after approximately one second. In addition the red abnormal LED 65 and the alarm relay 66 are energized. Further, the binary 0 from comparator 55 disables OR gate 71 to energize transmission gate 73 and apply the control tone from oscillator 72 to modulator 39. The control tone is thereby transmitted to the subscriber circuit (FIG. 1) where it is detected and rendered audible to indicate to the user that a fault exists in the channel. It is to be noted that when the subscriber circuit is off-hook, as assumed for this discussion, hybrid transformer 14 (FIG. 1) is balanced and the detected audio signals pass through the transformer secondary windings to the subscriber instrument. Importantly, substantially no audio tones pass through the primary winding of the transformer 14 to the transmit section of the subscriber circuit when the hybrid transformer is balanced. Therefore, no control tone passes through to modulator 16 in this mode, and no control tone is detected by detector 60 (FIG. 2). Detector 60 thus maintains a logic 0 output signal to inhibit AND gate 58 so that even if the reduced carrier level is sufficient to exceed the threshold at low level comparator 54, the logic 1 output signal from that comparator cannot actuate the AND gate. The failure indicator, red LED 65, therefore remains energized along with alarm relay 66 while the normal or green LED remains de-energized.

If the subscriber is in the on-hook (idle) condition and no faults are present in the system, off-hook detector 21 de-energizes transmission gate 17 so that the subscriber carrier $f_c$ is attenuated by attenuator 18 and transmitted at a reduced level. This level, as detected by detector 53 is above the threshold level of comparator 54 but below the threshold level of comparator 55. Therefore, comparator 54 provides a logic 1 output signal and comparator 55 provides a logic 0 output signal. The logic 0 from comparator 55, along with the logic 0 from ring detector 40 (it being assumed that the subscriber is not being called) disables OR gate 71 to permit gate 73 to pass control tone from oscillator 72. The control tone modulates the central office carrier $F_c$ at modulator 39 and is transmitted to the subscriber where it is detected by detection circuit 12. With the subscriber circuit on-hook, hybrid transformer 14 is unbalanced so that the detected control tone passes through the primary windings and voice conditioning circuits 23 to modulator 16 where it modulates the subscriber carrier $f_c$. The modulated subscriber carrier is transmitted at low level to the central office terminal where the control tone is detected by detector 60 to enable AND gate 58. This in turn enables OR gate 59 to energize green LED 62 and de-energize red LED 65 and alarm relay 66.

Assume now that a failure occurs during the on-hook mode whereby the subscriber carrier level, as received at the central office terminal, is below the threshold level set by resistance 56 for comparator 54. The output signal from that comparator becomes logic 0 and disables AND gate 58. The resulting logic 0 signal from OR gate 59 energizes the red LED 65 and alarm relay 66 and de-energizes the green LED 62.

Now assume that, instead of failure to receive the subscriber carrier, a failure occurs in either the transmission and reception of the central office carrier $F_c$ or in any of the voice frequency circuits in the transmit and receive portions of the subscriber circuit and central office terminal. In either case, the failure will manifest itself by an absence of detected control tone at detector 60. This detector responds by inhibiting AND gate 58 and thereby energizing the red LED 65 and alarm relay 66 while de-energizing the green LED 62.

It is important to note that the embodiment of FIGS. 1 and 2 permits automatic continuous checking of both the carrier frequency circuitry and the voice frequency circuitry in the on-hook mode. In other words, the operability of the entire channel is continuously monitored both at the central office terminal and at the subscriber circuit. During the off-hook mode only the carrier circuits are automatically monitored; however, the user of the subscriber circuit will obviously be well aware of a failure in the voice circuits during the off-hook mode.

The red LED 65 (failure indicator), the green LED 62 (normal indicator), and the yellow LED 68 (off-hook indicator) associated with each central office terminal provide a continuous indication of the status of the channel of which that terminal as a part. Moreover, actuation of alarm relay 66 permits an audible alarm to be sounded upon failure, drawing the attention of the operator who need only scan the channel indicators for a red light to determine which channel has failed. Upon such determination the operator may open switch 67 to cut-off the alarm until the failure has been corrected.

If, during the on-hook mode, a call is made to the subscriber, ring detector 40 provides trains of pulses at a 16⅔ to 66⅔ Hz rate to OR gate 71. Since the subscriber is on-hook, the signal from high level comparator 55 is logic 0 so that the pulses from detector 40 control operation of gate 73. Gate 73 is thus gated off for each pulse. As long as the subscriber remains on-hook and the ringing signal continues, the pulse-modulated control tone is transmitted to the subscriber and back and is detected by control tone detector 60. Driver 63 and inverter 64 incorporate delays of approximately one second duration to prevent LED's 62 and 65 from changing state between the 20 to 30 Hz pulses. The green LED 62, therefore, remains energized and the red LED de-energized. If the call is answered, the subscriber circuit goes off-hook and operation proceeds as described above, with the one second delays once again preventing premature changes of the indicator states.

In some instances it may be desirable to monitor only the carrier circuitry and not the voice circuitry. In such cases the control tone detector 60 and AND gate 58 would be dispensed with and the output signal from comparator 54 would be connected directly to OR gate 59. Likewise OR gate 71 would be dispensed with. In addition, low level comparator 54 would be of the type which detects levels within a limited range of levels below the normal level rather than detecting any level above a minimal threshold. In systems having independent oscillators 15 at the subscriber circuit, this modification monitors only transmission and reception of the subscriber carrier; it does not monitor the central office carrier circuits. However, if the system is of the type described in my U.S. Pat. No. 3,804,988, wherein the subscriber carrier is derived from the received central office carrier (such as by frequency division), transmit and receive circuitry for both carriers is monitored.

It should be noted that a potential ringing condition could exist in the line when either end is unterminated and the monitoring tone is transmitted. This is easily avoided by providing a suitable gate or switch 81 to break the transmission path at the central office during such conditions.

While I have descried and illustrated one specific embodiment of my invention, it will be clear that variations of the details of construction which are specifically illustrated and described may be resorted to without departing from the true spirit and scope of the invention as defined in the appended claims.

I claim:

1. In a carrier telephone system of the type in which information is transmitted from a remote station to a local station as modulation of a first carrier frequency signal and information is transmitted from said local station to said remote station via a second carrier frequency signal, and in which there exists idle and busy operating modes, an arrangement for continuously monitoring operabiity of said system comprising:
    means for transmitting said first carrier signal at a relatively high level during said busy mode and at a relatively low level during said idle mode;
    means at said local station for detecting reception at said first carrier signal at said relatively low level;
    means at said local station for detecting reception of said first carrier signal at said relatively high level; and
    indicator means at said local station for providing a failure indication in the absence of reception of said first carrier signal at at least said relatively low level.

2. The combination according to claim 1 wherein said second carrier signal is transmitted to said remote station during both said idle and busy modes and further comprising:
    means at said local station for modulating said second carrier signal with a voice frequency control tone during said idle mode;
    means at said remote station for detecting said control tone appearing as modulation on the received second carrier signal;
    means at said remote station for modulating said first carrier signal with control tone detected during said idle mode;
    means at said local station for detecting control tone appearing as modulation on the received first carrier signal; and
    wherein said inhibitor means further comprises means for inhibiting said failure indication upon simultaneous detection at said local station of said first carrier signal at said relatively low level and said control tone appearing as modulation on said first carrier level.

3. In a telephone carrier system of the type in which plural remote subscriber stations each communicate with a respective one of plural central office terminals using different carrier frequencies via a common transmission line; each subscriber station including: a receive section for receiving a specific central office carrier frequency signal modulated by voice frequency signals from a respective central office terminal and separating the voice frequencies therefrom, and a transmit section for modulating a specific subscriber carrier frequency signal with voice frequency signals and transmitting the modulated subscriber carrier to a respective central office terminal via said common transmission line; each central office terminal including: a receiver section for receiving a specific subscriber carrier frequency signal modulated by voice frequency signals from a respective subscriber station via said common transmission line and separating the voice frequencies therefrom, and a transmit section for modulating a specific central office carrier with voice frequency signals and transmitting the modulated central office carrier to a respective subscriber station via said common transmission line; an arrangement for continuously monitoring operability of said system comprising:

at each subscriber station:
means for distinguishing between when the subscriber station is in an idle on-hook mode and a busy off-hook mode;
means for selectively attenuating the transmitted subscriber carrier to a relatively low level in response to a on-hook mode at said subscriber station, said relatively low level being significantly lower than the normal subscriber carrier level during said off-hook mode;

at each central office terminal:
low level detector means for detecting reception of the attenuated subscriber carrier during said on-hook mode; and
indicator means for providing a fault indication in the absence of reception of said attenuated subscriber carrier during said on-hook mode.

4. The combination according to claim 3 further comprising at each subscriber station a hybrid transformer for inductively coupling voice frequency signals between a subscriber telephone instrument and the transmit and receive sections of said subscriber station, said hybrid transformer being balanced in said off-hook mode whereby there is no significant feed-through of voice frequency signals from the receive to the transmit sections of said subscriber station but which is unbalanced in said on-hook mode and permits feed-through of significant voice frequency signals from the receive to the transmit sections of said subscriber station whereby the fed through voice signals modulate said subscriber carrier and are transmitted via said common transmission line, said system further including:

at each central office terminal:
a source of control tone in the voice frequency range;
gating means for selectively modulating said central office carrier signal with said control tone;
means for transmitting the central office carrier, modulated by said control tone, via said common transmission line;
a high level subscriber carrier detector for detecting reception of said specific subscriber carrier signal at said normal level;
means responsive to reception of said normal subscriber carrier signal level for deactivating said gating means to inhibit modulation of said central office carrier by said control tone and responsive to absence of reception of said normal subscriber carrier signal level for actuating said gating means to enable modulation of said central office carrier by said control tone;
means for detecting control tone appearing as modulation on the received subscriber carrier; and
means responsive to the simultaneous absence of reception of said normal subscriber carrier level and absence of detection of said control tone as modulation of the subscriber carrier for actuating said indicator means to provide a fault indication.

5. The combination according to claim 4 wherein said indicator means comprises both visible and audible signals.

6. The combination according to claim 4 further comprising at each central office terminal normal indicator means responsive to detection of reception of said normal subscriber carrier level by said high level subscriber carrier detector for providing a distinctive normal operation indication, and responsive to simultaneous detection of control tone appearing as modulation on the received subscriber carrier and detection of the attenuated subscriber carrier level by said low level detector means for providing said distinctive normal operations indication.

7. The combination according to claim 4 wherein said control tone is nominally an audio signal otherwise employed as a ringing tone signal in some carrier telephone systems, said system further comprising means at each central office terminal for ringing the subscriber station associated therewith by pulsedly de-actuating said gating means at a nominal $16\frac{2}{3}$ to $66\frac{2}{3}$ Hz rate to thereby pulsedly interrupt modulations of said central office carrier by said control tone in the absence of detection of said normal subscriber carrier level by said high level subscriber carrier detector.

8. The method of continuously monitoring the operability of individual channels of a multiple channel carrier telephone system of the type in which multiple remote subscriber stations communicate with respective local central office terminals via a common transmission line using different subscriber and central office carrier signal frequencies for each channel, said method comprising the steps of:

at each subscriber station:
transmitting the subscriber carrier signal at a normal level during a busy off-hook mode and at a substantially reduced level during a idle on-hook mode;

at each central office terminal:
detecting reception of said subscriber carrier at least at said substantially reduced level during said on-hook mode; and
providing a fault indication in the absence of detected subscriber carrier at a level at least equal to said substantially reduced level.

9. The method according to claim 8 further comprising the steps of:

at each central office terminal:
detecting reception of said subscriber carrier signal at said normal level;
in response to detecting reception of said subscriber carrier signal at said normal level, modulating said central office carrier signal with a control tone in the voice frequency range;
transmitting the modulated central office carrier signal to said subscriber station via some common transmission line;

at each subscriber station:
in the on-hook mode, modulating said subscriber carrier signal with control tone received as modulation on said central office carrier signal;
transmitting the control tone-modulated subscriber carier signal back to said central office terminal via said common transmission line;

at each central office terminal:
detecting control tone received as modulation of said subscriber carrier signal; and
actuating a fault indicator in response to simultaneous reception of said subscriber carrier signal at least at said substantially reduced level and detection of control tone received as modulation of said subscriber carrier signal.

* * * * *